(12) United States Patent
Rennie

(10) Patent No.: US 7,552,342 B1
(45) Date of Patent: Jun. 23, 2009

(54) METHOD AND SYSTEM FOR INCREASING THE TAMPER RESISTANCE OF A SOFTWARE APPLICATION

(75) Inventor: Jeffrey Glen Rennie, Mountain View, CA (US)

(73) Assignee: Rennie Glen Software, LLC, Mountain View, CA (US)

( * ) Notice: Subject to any disclaimer, the term of this patent is extended or adjusted under 35 U.S.C. 154(b) by 821 days.

(21) Appl. No.: 11/059,936

(22) Filed: Feb. 16, 2005

(51) Int. Cl.
*G06F 21/22* (2006.01)
(52) U.S. Cl. .................................. 713/188; 713/194
(58) Field of Classification Search ......... 713/193–194, 713/188
See application file for complete search history.

(56) References Cited

U.S. PATENT DOCUMENTS

| | | | |
|---|---|---|---|
| 6,078,909 A | 6/2000 | Knutson | |
| 6,594,761 B1 | 7/2003 | Chow et al. | |
| 6,643,775 B1 | 11/2003 | Granger et al. | |
| 6,779,114 B1 | 8/2004 | Chow et al. | |
| 6,789,199 B1 | 9/2004 | Wilhelm, Jr. | |
| 6,836,847 B1 | 12/2004 | Zinger et al. | |
| 6,842,862 B2 | 1/2005 | Chow et al. | |
| 2005/0005147 A1* | 1/2005 | Fischer et al. | 713/193 |
| 2005/0050342 A1* | 3/2005 | Boivie et al. | 713/193 |
| 2006/0161761 A1* | 7/2006 | Schwartz et al. | 711/216 |

* cited by examiner

*Primary Examiner*—Gilberto Barron, Jr.
*Assistant Examiner*—Venkat Perungavoor

(57) ABSTRACT

A method for increasing the tamper resistance of a computer software application comprises four steps. In the first step, a datum in the application to protect from tampering is chosen. In the second step, a location in memory into which the datum will be loaded when the application is executed is calculated. In the third step, user-purpose code to modify is chosen. In the fourth step, the chosen user-purpose code is modified so that, when executed, it reads a value from the memory location and uses it in useful calculation.

18 Claims, 9 Drawing Sheets

FIG. 6A

```
/****************************************************************
Sample code from a calculator software application.
****************************************************************/
include <memory.h> char developer_public_key[] = "-----BEGIN PUBLIC KEY-----\n"
"MIGfMA0GCSqGSIb3DQEBAQUAA4GNADCBiQKBgQCfJa4G26oVyi8+Y+9bebjLb7MH\n"
"RH+D2ydqB3rSFQc/Alo6YpTz1AVt31V6Ek9eSaAGAM88U+uxaG88k3h5qEtbTCNT\n"
"jCDqdbO/iCzmX7dj8/eXVV3a23JBDyUtsOrdMAL/uno9Hn195uXiOnqUpOn11NQs\n"
"yRquIszMfnMCgT6pwwIDAQAB\n"
"-----END PUBLIC KEY-----\n";

const size_t sizeof_developer_public_key = sizeof(developer_public_key);

// Returns nonzero if the signature is an authentic signature created
// using the developer's private key.  Otherwise returns zero.
// CalculateSignature() is defined elsewhere and its definition is
// not necessary to demonstrate the present invention.
int VerifySignature(const char* certificate, int certificate_length,
                    const char* signature, int signature_len) {
  char correct_signature[256];
  CalculateSignature(certificate, certificate_length,
    correct_signature, sizeof(correct_signature));
  return sizeof(correct_signature) == signature_len &&
    memcmp(signature, correct_signature, sizeof(correct_signature)) == 0;
}

// Demarks the end of VerifySignature()'s executable code.
void VerifySignatureEnd() { }

// User purpose function  Calculates the square root of x.
unsigned int CalcSquareRoot(unsigned int x) {
  int i;
  unsigned int a = 0, e = 0, r = 0;
  const int BITSPERINTEGER = 32;

for (i=0; i < (BITSPERINTEGER >> 1); i++) {
    r <<= 2;
    r += x >> 30;
    x <<= 2;

a <<= 1;
    e  = (a<<1) | 1;

if (r >= e) {
      r -= e;
      a++;
    }
  }
  return a;
}
```

FIG. 6B

```
/****************************************************************
 Sample code from a calculator software application after
 method of the present invention has been applied.
****************************************************************/
include <memory.h> char developer_public_key[] = "-----BEGIN PUBLIC KEY-----\n"
"MIGfMA0GCSqGSIb3DQEBAQUAA4GNADCBiQKBgQCfJa4G26oVyi8+Y+9bebjLb7MH\n"
"RH+D2ydqB3rSFQc/Alo6YpTz1AVt31V6Ek9eSaAGAM88U+uxaG88k3h5qEtbTCNT\n"
"jCDqdbO/iCzmX7dj8/eXVV3a23JBDyUtsOrdMAL/uno9Hnl95uXiOnqUpOn11NQs\n"
"yRquIszMfnMCgT6pwwIDAQAB\n"
"-----END PUBLIC KEY-----\n";

const size_t sizeof_developer_public_key = sizeof(developer_public_key);

// Returns nonzero if the signature is an authentic signature created
// using the developer's private key.  Otherwise returns zero.
// CalculateSignature() is defined elsewhere and its definition is
// not necessary to demonstrate the present invention.
int VerifySignature(const char* certificate, int certificate_length,
                    const char* signature, int signature_len) {
  char correct_signature[256];
  CalculateSignature(certificate, certificate_length,
    correct_signature, sizeof(correct_signature));
  return sizeof(correct_signature) == signature_len &&
    memcmp(signature, correct_signature, sizeof(correct_signature)) == 0;
}

// Demarks the end of VerifySignature()'s executable code.
void VerifySignatureEnd() { }

// User purpose function  Calculates the square root of x.
unsigned int CalcSquareRoot(unsigned int x) {
  int i;
  unsigned int a = 0, e = 0, r = 0;
  const int BITSPERINTEGER = 32 + (developer_public_key[34] - 'G');

for (i=0; i < (BITSPERINTEGER >> 1); i++) {
    r <<= 2;
    r += x >> 30;
    x <<= 2;

a <<= 1;
    e = (a<<1) | 1;

if (r >= e) {
      r -= e;
      a++;
    }
  }
  return a + (*(((const char*)&VerifySignature) + 4) - 76);
}
```

FIG. 7

```
/******************************************************************
 Prints the machine code generated by the compiler for the
 global variable developer_public_key, and the function
 VerifySignature().
******************************************************************/
#include <stdio.h>

/* Helper function prints byte values of argument a. */
void PrintBytes(const char* a, int count) {
  int i;
  for (i = 0; i < count; ++i)
    printf("%d : %d : '%c'\n", i, a[i], a[i]);
}

/* References to code in FIG. 6A */
extern char developer_public_key[];
extern const size_t sizeof_developer_public_key;
extern int VerifySignature(const char* certificate, int certificate_length,
                           const char* signature, int signature_len);
extern void VerifySignatureEnd();

/* Prints machine code in developer_public_key, and VerifySignature()*/
int main() {
  printf("developer_public_key[]\n");
  PrintBytes(developer_public_key, sizeof_developer_public_key);

printf("\nVerifySignature()\n");
  PrintBytes((const char*)&VerifySignature,
             ((const char*)&VerifySignatureEnd) - ((const
  char*)&VerifySignature));
  return 0;
}
```

FIG 8

```
developer_public_key[]
 0 : 45 : '-'
 1 : 45 : '-'
 2 : 45 : '-'
 3 : 45 : '-'
 4 : 45 : '-'
 5 : 66 : 'B'
 6 : 69 : 'E'
 7 : 71 : 'G'
 8 : 73 : 'I'
 9 : 78 : 'N'
10 : 32 : ' '
11 : 80 : 'P'
12 : 85 : 'U'
13 : 66 : 'B'
14 : 76 : 'L'
15 : 73 : 'I'
16 : 67 : 'C'
17 : 32 : ' '
18 : 75 : 'K'
19 : 69 : 'E'
20 : 89 : 'Y'
21 : 45 : '-'
22 : 45 : '-'
23 : 45 : '-'
24 : 45 : '-'
25 : 45 : '-'
26 : 10 : '
'
27 : 77 : 'M'
28 : 73 : 'I'
29 : 71 : 'G'
30 : 102 : 'f'
31 : 77 : 'M'
32 : 65 : 'A'
33 : 48 : '0'
34 : 71 : 'G'
```

```
35 : 67 : 'C'
36 : 83 : 'S'
37 : 113 : 'q'
38 : 71 : 'G'
39 : 83 : 'S'
40 : 73 : 'I'
.
.
.

VerifySignature()
 0 : -117 : '‹'
 1 : -117 : '‹'
 2 : 36 : '$'
 3 : 8 : '☐'
 4 : 76 : 'L'
 5 : 84 : 'T'
 6 : 36 : '$'
 7 : 4 : '☐'
 8 : -127 : '☐'
 9 : -20 : 'ì'
10 : 0 : ' '
.
.
.
86 : 51 : '3'
87 : -64 : 'À'
88 : -127 : '☐'
89 : -60 : 'Ä'
90 : 0 : ' '
91 : 1 : '☐'
92 : 0 : ' '
93 : 0 : ' '
94 : -61 : 'Ã'
95 : -112 : '☐'
```

METHOD AND SYSTEM FOR INCREASING THE TAMPER RESISTANCE OF A SOFTWARE APPLICATION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

The present invention relates generally to computer software, and more specifically, to a method of making a computer software application resistant to tampering.

BACKGROUND OF THE INVENTION

Software products (applications) are highly vulnerable to unauthorized copying and use (piracy). Illegally copied applications are commonly distributed on a wide-scale basis over the Internet and via recordable CD-ROMs. Software developers lose billions of dollars per year as a result of such unauthorized copying and distribution.

Software developers commonly use a variety of methods to prevent others from illegally copying and using their products. According to one common method, a software developer distributes a digital license certificate to an authorized user. The digital license certificate contains the terms of use of the software application, such as which user and on which computer the software is authorized for use. When a user attempts to use the application, copy-protection code in the application checks the license certificate to be sure the current use falls under the license terms, and that the license certificate was authentically issued by the software developer. If the copy-protection code finds no license certificate, or a forged license certificate on the user's computer, the application crashes or other wise fails to operate properly. License certificate copy-protection schemes often make use of a cryptographic digital signature algorithm. U.S. Pat. No. 6,078,909 to Knutson (2000) describes such a software licensing system that uses a digital signature algorithm.

However, even applications that use such a licensing system are very vulnerable to attack. Since a computer software application is simply a listing of data bits, ultimately, one cannot prevent attackers from making copies and making arbitrary changes. As well, there is no way to prevent attackers from monitoring the computer software as it executes.

A common defense against tampering is obfuscation. U.S. Pat. No. 6,842,862 to Chow, et al. (2005) describes a method of making software tamper-resistant by obfuscating the executable code. U.S. Pat. No. 6,643,775 to Granger, et al. (2003) also describes a method of making software tamper-resistant by obfuscating executable code.

However, strategies based on obfuscating code suffer the following disadvantages:

(a) Obfuscating code fails to protect embedded data from tampering. As will be shown in a later example, it is often possible to defeat copy protection schemes by modifying only embedded data, without understanding or modifying any executable code.

(b) It is difficult to obfuscate code well. It usually requires using a specially designed compiler or tool to obfuscate the code.

(c) Obfuscating code provides only weak tamper resistance. If an attacker modifies a small portion of obfuscated code in an application, the rest of the code in the application will still execute correctly.

(d) Obfuscating code usually results in a performance degradation of the application. The obfuscated code contains many more instructions than the original code. Therefore, the processor must take more time and consume more power to execute the obfuscated code than to execute the original code.

OBJECTS AND ADVANTAGES

There is therefore a need for a better method of making computer software resistant to tampering. A method is needed to protect data and executable code in the application, that minimally impacts the performance of the application, and that doesn't require the use of specialized tools to implement.

Therefore, it is an object of the present invention to provide a method of making software resistant to tampering. Several objects and advantages of the present invention are:

(a) to provide a method of making an application tamper resistant which can protect data and executable code;

(b) to provide a method of making an application strongly tamper resistant, such that modifying protected code or data will cause user-purpose code in the application to yield non-sensical results;

(c) to provide a method of making an application tamper resistant which can be implemented by making only small changes to the high-level language source code, or to the machine code, without the use of specialized software tools;

(d) to provide a method of making an application tamper resistant which has minimal impact on the performance of the application.

SUMMARY OF THE INVENTION

In accordance with the present invention, a method for increasing the tamper resistance of a computer software application comprises four steps. In the first step, a datum in the application to protect from tampering is chosen. In the second step, a location in memory into which the datum will be loaded when the application is executed is calculated. In the third step, user-purpose code to modify is chosen. In the fourth step, the chosen user-purpose code is modified so that, when executed, it reads a value from the memory location and uses it in useful calculation.

BRIEF DESCRIPTION OF THE DRAWINGS

FIG. 6A presents source code in the C programming language to which the method of the present invention will be applied in an example.

FIG. 7 presents source code in the C programming language used in an example of the present invention.

FIG. 8 presents sample output from compiling and running the source code in FIG. 6A and FIG. 7.

FIG. 6B presents the source code in FIG. 6A after the method of the present invention has been applied.

Figure 1:
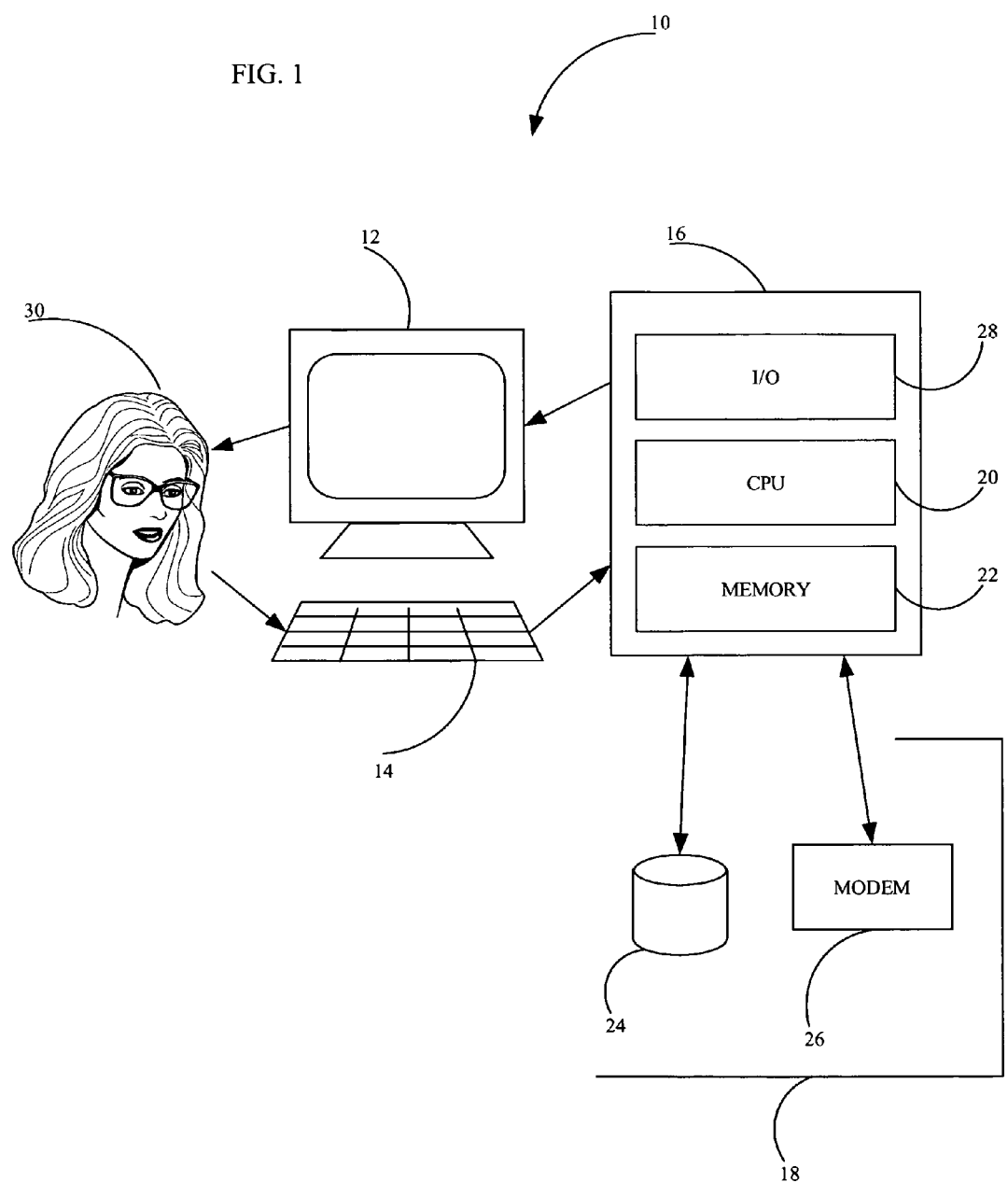
FIG. 1 presents an exemplary computer system in which the invention may be embodied.

| DRAWINGS - Reference Numerals | |
|---|---|
| 10 | computer system |
| 12 | display |
| 14 | keyboard |
| 16 | computer |
| 18 | external devices |
| 20 | central processing unit |
| 22 | internal memory |
| 24 | additional memory |
| 26 | communications interface |
| 28 | input/output interface |
| 30 | computer programmer |
| 60 | source code editor |
| 62 | compiler |
| 64 | tamper-resistant precompiler |
| 66 | tamper-resistant recompiler |

DETAILED DESCRIPTION OF PREFERRED EMBODIMENTS OF THE INVENTION

I. Terminology

As used hereinafter, the following terms have the following meanings (except where specifically indicated otherwise):

The term "application" refers to the target program to which one or more copy protection schemes are being or have been applied to deter unauthorized use. An application may include data modules and multiple code modules, including modules that run remotely from one another. Examples of applications include word processing programs, 3D animation programs, spreadsheet programs, online banking programs, and operating systems.

The term "copy-protection code" refers to executable code that implements an authorization verification scheme to prevent or deter the use of unauthorized copies of an application.

The term "user-purpose code" refers to executable code that implements a useful function for the user. In a word processor application, executable code that implements a spellchecker is an example of user-purpose code.

The term "embedded data" refers to data distributed as part of the software application. For example, a list of all the words in the English language is distributed as part of a spellchecker application. This list of words is embedded data. Embedded data may be embedded into code modules, or distributed with the application as separate data modules.

The term "source code" refers to textual code written in a programming language (such as C, C++, Pascal, Java™, or Python). Java™ is a registered trademark of Sun Microsystems, Inc. "Machine code" refers to the low-level numerical (binary) code that is directly retrieved and processed by a microprocessor.

The term "executable code" refers to software code that can be readily executed by a processor or language interpreter. Machine code, and Python source code which can be readily interpreted by a Python interpreter, are examples of executable code.

The term "software developer" or "developer" refers to an individual or entity that develops applications. The term "attacker" refers to an individual or entity that is seeking to defeat a copy-protection scheme that has been applied to an application, such as by removing or modifying an application's copy-protection code to produce a "cracked" version that runs properly without authorization from the software developer.

The term "compiler" refers to a program that translates source code into executable code. The term "interpreter" refers to a program that reads, interprets, and executes source code. The term "precompiler" refers to a program that transforms source code before it is compiled by a compiler or executed by an interpreter. The term "recompiler" refers to a program the transforms executable code. The term "source code editor" or "editor" refers to a program that enables a user to browse and modify source code.

The term "debugger" refers to a software tool that is used to detect errors in an application, by performing step-by-step execution of application code and viewing the content of code variables. A debugger can also be used by an attacker to analyze a target application. The term "binary editor" refers to a software tool that is used to modify binary data, including executable code.

II. Overview

The invention lies in a means for building a software application in such a manner that it is fragile to tampering. Attempts to modify the software code will therefore cause it to become inoperable in terms of its original function. The tamper-resistant software may continue to run after tampering, but no longer performs sensible computation.

The extreme fragility embedded into the program by means of the invention does not cause execution to cease immediately, once it is subjected to tampering. It is desirable for the program to continue running so that, by the time the attacker realizes something is wrong, the modifications and events which caused the functionality to become nonsensical are far in the past. This makes it very difficult for the attacker to identify and remove the changes that caused the failure to occur.

An example of a system upon which the invention may be performed is presented as a block diagram in FIG. 1. This computer system 10 includes a display 12, keyboard 14, computer 16 and external devices 18.

The computer 16 may contain one or more processors or microprocessors, such as a central processing unit (CPU) 20. The CPU 20 performs arithmetic calculations and control functions to execute software stored in an internal memory 22, preferably random access memory (RAM) and/or read only memory (ROM), and possibly additional memory 24. The additional memory 24 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 24 may be physically internal to the computer 16, or external as shown in FIG. 1. A computer-readable medium includes the memory components listed above.

The computer system 10 may also include communications interface 26 which can include a modem, a network interface such as an Ethernet card, a serial or parallel communications port.

Input and output to and from the computer 16 is administered by the input/output (I/O) interface 28. This I/O interface 28 administers control of the display 12, keyboard 14, external devices 18 and other such components of the computer system 10.

A computer programmer 30, having ordinary skill in the art of writing computer software code uses computer system 10 to edit the source code of the target application according to the algorithm of the present invention.

The invention is described in these terms for convenience purposes only. It would be clear to one skilled in the art that the invention may be applied to other computer or control systems 10. Such systems would include all manner of appliances having computer or processor control including telephones, cellular telephones, televisions, television set top units, lap top computers, personal digital assistants and automobiles.

Figure 2:
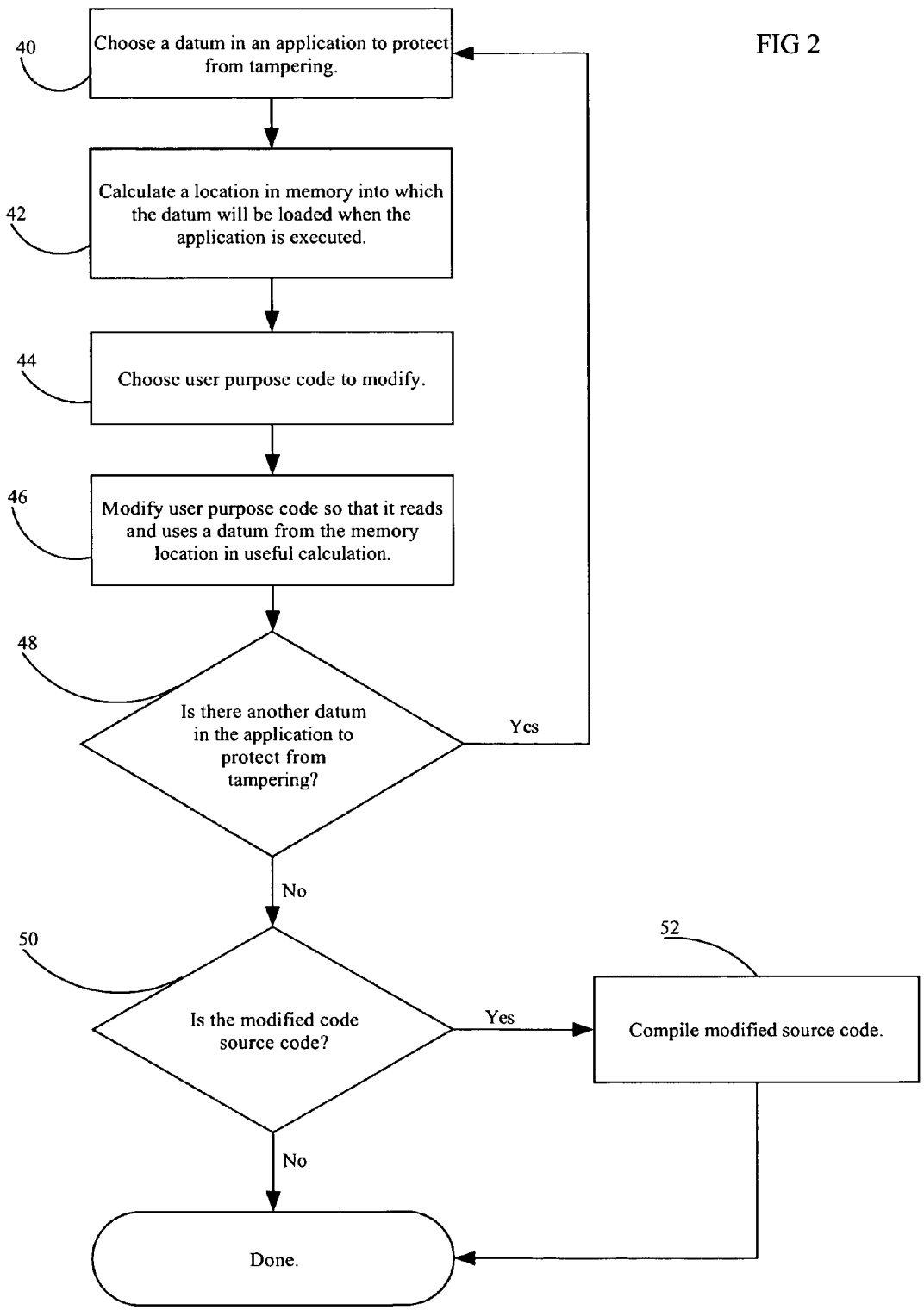
FIG. 2 presents a flow chart of a general algorithm for implementing the invention.

FIG. 2 presents the general algorithm of the present invention.

In step 40, a datum to protect from tampering is chosen from within an application's data.

In step 42, a memory location into which the datum will be loaded when the application is executed is calculated.

In step 44, user-purpose code to modify is chosen.

In step 46, the user-purpose code chosen in step 44 is modified so that it yields the correct answer if the datum at the memory location is identical to the datum chosen to protect.

In step 48, a decision is made as to whether there is another datum in the application to protect from tampering.

In step 50, the algorithm branches depending on whether the code modified in step 46 is source code.

In step 52, the source code is compiled to build the application.

Figure 3:
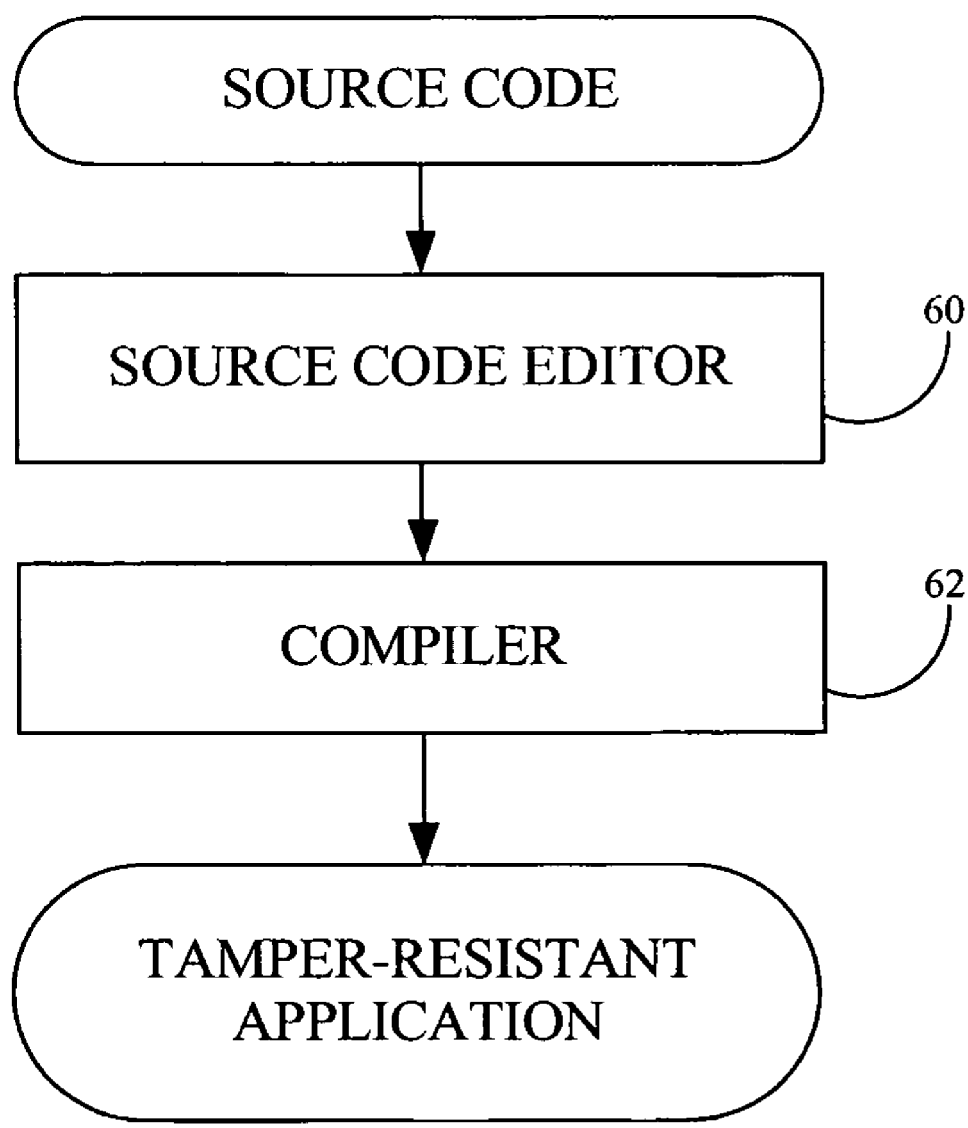
FIG. 3 presents a flow chart of the invention applied to a source code editor and compiler in the preferred embodiment of the invention.

FIG. 3 presents a flow chart of the invention applied to a source code editor and compiler in the preferred embodiment of the invention. Programmer 30 edits the source code according to the algorithm of the present invention using source code editor 60, then compiles the source code into a tamper-resistant application using compiler 62.

Figure 4:
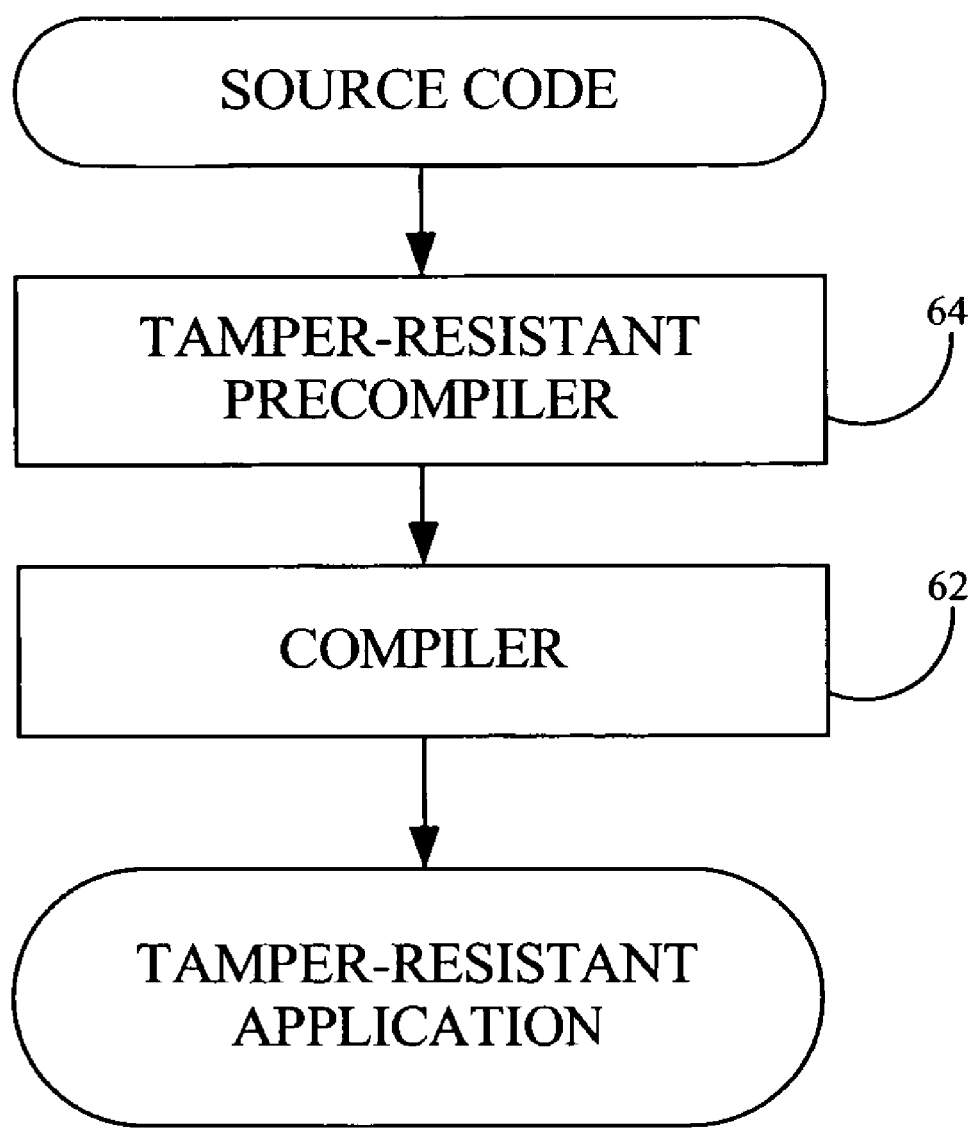
FIG. 4 presents a flow chart of the invention applied to a source code precompiler in an alternate embodiment of the invention.

FIG. 4 presents a flow chart of the invention applied to a precompiler in an alternate embodiment of the invention. Tamper-resistant precompiler 64 is a software program that transforms source code according to the algorithm of the present invention. The source code output from the precompiler is then compiled by compiler 62 to generate a tamper-resistant application.

Figure 5:
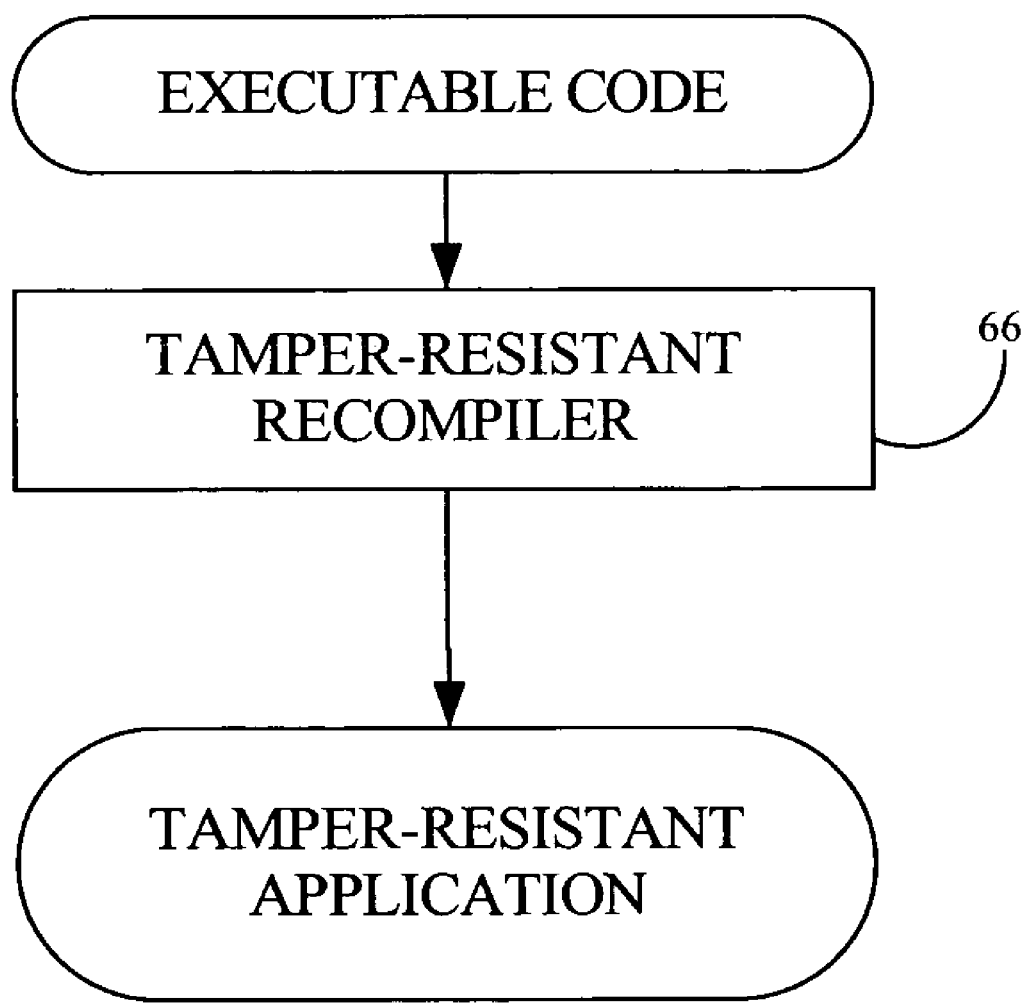
FIG. 5 presents a flow chart of the invention applied to a recompiler in an alternate embodiment of the invention.

FIG. 5 presents a flow chart of the invention applied to a recompiler. Tamper-resistant recompiler 66 is a software program that transforms executable code according to the algorithm of the present invention.

III. Example Application

The present invention will be apparent to someone with common skill in the art of computer programming by viewing the following example and sample source code.

The application to be made tamper-resistant in this example is a calculator application that performs common arithmetic operations such as addition, subtraction, multiplication, division, and square root. The application uses a digital signature scheme for copy protection.

To implement the digital signature copy-protection scheme, the developer creates a public and private key pair. The private key is kept secret and is known only to the developer. The public key is distributed as embedded data in the application. The developer authorizes use of the application by distributing a digital license certificate and a digital signature. The license certificate comprises terms of the license, such as the start date and the end date of the time period during which the application is licensed for use, an identifier identifying the computer on which the application is licensed for use, and the like. The developer uses his private key to sign a digital license certificate, and generate a digital signature, and sends the license certificate and signature to an authorized user. When the user runs the application, the copy-protection code in the application then uses the public key to verify the authenticity of the digital license certificate and digital signature.

FIG. 6A shows source code for the example calculator application. FIG. 6A does not show the complete source code for the application; it shows only the source code that will be used for demonstrating the present invention.

In FIG. 6A, the variable developer_public_key contains the developer's public key. The public key is encoded in a format common to many cryptographic software applications and libraries, such as the freely-available openssl library.

IV. Example Attacks

Because the example application is distributed over the Internet, an attacker can easily obtain a copy of the application, and analyze the application using a debugger and binary editor.

An attacker with common skill in the art of disabling copy-protection code will easily be able to recognize the embedded public key as a cryptographic public key when analyzing the application. The application's copy-protection scheme uses this embedded public key to verify the authenticity of license certificates and license signatures issued by the developer. Because the attacker does not know the developer's private key, he cannot generate a valid signature, and any license certificate and signature he attempts to forge will be recognized as a forgery by the application's copy-protection code.

However, there is still a well-known attack that will circumvent the copy-protection scheme: the key swap. According to this attack, the attacker generates his own public and private key pair, and replaces the developer's public key embedded in the application with his own public key. He then creates a license certificate and generates a signature by signing the license certificate with his own private key. He then runs the tampered version of the application with the license certificate and signature he generated. Because the copy-protection code in the application now uses the attacker's public key to verify the authenticity of the license certificate and signature, the application accepts the forged license certificate and signature as authentic. The attacker has then effectively cracked the application because he does not need an authentic license issued by the developer to run the application.

The prior art based on obfuscating code is ineffective at preventing this attack. Because the attacker never had to understand or modify any executable code, it makes no difference whether the code was obfuscated. If the embedded public key were obfuscated according to the prior art, it would still be vulnerable. In order for the key to be correctly processed by the cryptographic functions, the public key would have to be unobfuscated during execution, and an attacker would be able to witness the unobfuscated key by using a debugger to observe memory.

An attacker may also attempt to modify the executable code. In FIG. 6A, the function VerifySignature( ) is likely target for attack. According to one common method of attack, the attacker modifies VerifySignature( )'s executable code in the application, so that it always returns 1. The attacker then runs the tampered application. When the copy-protection code calls VerifySignature( ) to verify the authenticity of a license certificate and signature, the tampered code always returns 1, so a forged license certificate and signature will be accepted as authentic. Again, the attacker has then effectively cracked the application because he does not need an authentic license issued by the developer to run the application.

The prior art based on obfuscating code provides only weak tamper resistance against this attack. If VerifySignature( )'s executable code were obfuscated, it would be more difficult for the attacker to understand and modify the executable code so that it returns 1. But in the course of modifying VerifySignature( )'s code, there is no potential for him to break other parts of the application. In other words, modifying VerifySignature( )'s executable code, obfuscated or not, may break VerifySignature( ) so that it returns nonsensical results, but modifying VerifySignature( )'s executable code will not break CalcSquareRoot( )'s executable code. Thus, the prior art based on obfuscating code provides only limited tamper resistance. User-purpose executable code in the application will still execute normally even though VerifySignature( )'s executable code has been tampered.

V. The Method of the Present Invention Applied to the Example Application

FIG. 6A is a listing of source code. But in this example, the developer will distribute the executable code, not the source code, so it is the executable code that needs to be protected from tampering. To display the executable code that compiler 62 will generate when it compiles the source code in FIG. 6A, programmer 30 prepares the source code shown in FIG. 7. Programmer 30 compiles the source code in FIG. 7 together with the source code in FIG. 6A, and runs the resulting executable code. The executable code prints the value of each byte in the developer's public key, and the value of each byte in VerifySignature( )'s executable code. FIG. 8 shows partial output from compiling and executing the source code in FIG. 6A and FIG. 7.

Programmer 30 then applies the algorithm in FIG. 2 to the source code in FIG. 6A. First, programmer 30 decides to protect the embedded public key, because as was shown in an earlier example, it can be modified as part of a key swap attack.

According to step 40, programmer 30 chooses the $35^{th}$ byte of developer public key, the letter 'G', to protect from tampering.

According to step 42, programmer 30 calculates a memory location into which this letter 'G' will be loaded. As will be obvious to a computer programmer with common skill in the art of programming in C, compiler 62 will compile the expression 'developer_public_key[34]' to executable code that reads a byte from the memory location into which this 'G' will be loaded. So when this expression is used in source code, compiler 62 calculates a memory location into which this 'G' will be loaded.

According to step 44, programmer 30 chooses to modify the statement "const int BITSPERINTEGER=32;" in FIG. 6A.

According to step 46, programmer 30 modifies the code chosen in step 44 so that it yields a useful result if the byte at the memory location calculated in step 42 is 'G'. Specifically, the programmer modifies the statement chosen in step 44 to become "const int BITSPERINTEGER=32+(developer_public_key[34]-'G');" If an untampered version of the application is executed, the statement will store the number 32 into the variable BITSPERINTEGER, and the function CalcSquareRoot( ) will return a useful result. However if an attacker tampers with the application, replaces the developer's public key with his own public key, and in the process changes the $35^{th}$ byte to anything other than 'G', then when the application is executed, a number other than 32 will be stored into the variable BITSPERINTEGER, and the function CalcSquareRoot( ) will return a non-useful result. Specifically, it will not return the square root of the argument x. Hence, the $35^{th}$ letter of the developer's public key is protected from tampering.

According to step 48, programmer 30 decides that there is other data in the application that needs to be protected from tampering. Programmer 30 recognizes that if an attacker replaces the developer's public key with another validly formatted key, there is a about a one in 100 chance that the attacker's key's $35^{th}$ letter will be 'G', so there is still about a one in 100 chance that such a tampered version would yield correct output. Programmer 30 decides this possibility is too high, and repeats steps 40 through 50 nine more times choosing nine other bytes in the public key, and choosing nine other user-purpose code statements. After these steps are complete, the chances that a version of the application in which the public key has been replaced by an attacker would yield useful output is now about 1 in $100^{10}$, or 1 in 100000000000000000000. Hence, the developer's public key is protected from tampering.

According to an earlier example, an attacker can modify an application's executable code in addition to its embedded data. So the following example shows how the method of the present invention can be applied to protect executable code from tampering.

As was shown in a prior example attack, in FIG. 6A, VerifySignature( )' executable code can be modified to always return 1, and effectively disable the application's copy-protection scheme. Therefore, programmer 30 decides to protect VerifySignature( )'s executable code from tampering.

According to step 40, programmer 30 chooses to protect the $5^{th}$ byte of executable code of the function VerifySignature( ). From previously compiling and running the code in FIG. 6A and FIG. 7, and observing the output in FIG. 8, programmer 30 has learned that the value of the $5^{th}$ byte of executable code of the VerifySignature( ) function is 76.

According to step 42, programmer 30 calculates a memory location into which this byte will be loaded when the application executes. Again, taking advantage of features of the C language, programmer 30 realizes that compiler 62 will compile the expression "*(((const char*)&VerifySignature)+4)" to executable code that reads data from the $5^{th}$ byte of VerifySignature( )'s executable code.

According to step 44, programmer 30 chooses to modify the statement "return a;" in the user purpose function CalcSquareRoot( ).

According to step 46, programmer 30 modifies the statement chosen in step 44 to become "return a+(*((const char*)&VerifySignature)+4)−76);" If an untampered version of the application is executed, the statement will return the value of variable a, and the function CalcSquareRoot( ) will return a useful result. However if an attacker tampers with the application, modifies the executable code in VerifySignature( ), and in the process changes the $5^{th}$ byte of VerifySignature( )'s executable code to a value other than 76, then when the tampered application is executed, a value other than the value in variable 'a' will be returned, and the function CalcSquareRoot( ) will return a non-useful result. Specifically, it will not return the square root of the argument x. Hence, the $5^{th}$ byte of VerifySignature( )'s executable code is protected from tampering.

According to step 48, the programmer 30 decides there is more data that needs to be protected from tampering, specifically all the other bytes in VerifySignature( )'s executable code. When programmer 30 compiled and ran the code in FIG. 6A and FIG. 7, and observed the output in FIG. 8, he learned that there are 96 bytes of executable code in the function. So, programmer 30 repeats steps 40 through 50 using the other 95 bytes of VerifySignature( )'s executable code, and 95 other user-purpose code statements. Hence, all of VerifySignature( )'s executable code is protected from tampering.

FIG. 6B shows the source code from FIG. 6A after the example methods have been applied.

VI. Conclusions, Ramifications, and Scope

The current method yields a strongly tamper-resistant application, in that modifying the protected data will break user-purpose executable code in unpredictable ways. The user-purpose code that breaks as a result of the modification is distant from the tampered data in both time and space. In other words, because modern applications often consist of millions of bytes of data and executable code, there may be millions of bytes between the tampered data and the broken user-purpose executable code. Additionally, user-purpose code broken by the tampering may be executed seconds, minutes, or even hours after tampered copy-protection code is executed This great distance between the broken user-purpose code and the tampered data makes searching through the millions of bytes comprising the application and finding the broken user-purpose code unfeasible.

The present invention introduces only simple memory read and integer arithmetic operations into the user-purpose code. No multiplication, division, floating-point arithmetic, or complex calculations are required, but are not specifically precluded. Modern microprocessors execute memory read and integer arithmetic operations extremely quickly, so the present invention has minimal impact on the performance of the application being protected from tampering.

Accordingly, the reader will see that the method of the present invention can be used to increase the tamper resistance of a software application. Furthermore, the method of the present invention has the additional advantages in that it can protect both executable code and embedded data;

it can be implemented using common software tools such as a source code editor and a compiler;

it has minimal impact on the performance of the application;

it provides strong tamper resistance.

Although the description above contains many specificities, these should not be construed as limiting the scope of the invention but as merely providing illustrations of some of the presently preferred embodiments of this invention. For example, other source code languages such as Python or Java™ may be used, or executable code may be transformed directly. Thus the scope of the invention should be determined by the appended claims and their legal equivalents, rather than by the examples given.

I claim:

1. A method for increasing the tamper-resistance of a computer software application for use in computer comprising the steps of:

choosing a location in said application to protect from tampering;

choosing an executable code in said application to modify;

observing an expected result of executing said executable code;

modifying said executable code so that, when executed, said executable code reads a datum from said location, uses said datum as input for an operation in said executable code, and yields said expected result;

whereby executing said modified executable code yields a result that varies with said datum;

and whereby subsequent tampering at said location and executing said modified executable code will yield an unexpected result.

2. The method of claim 1, wherein the step of choosing a location to protect from tampering, location in the data segment of the application is chosen.

3. The method of claim 1, wherein the step of choosing a location to protect from tampering, a location in the executable segment of the application is chosen.

4. The method of claim 1, wherein the step of choosing a location to protect from tampering, a location containing license-control code is chosen.

5. A computer system for increasing the tamper resistance of a computer software application, comprising:

means for choosing a location in said application to protect from tampering;

means for choosing an executable code in said application to modify;

means for observing an expected result of executing said executable code;

means for modifying said executable code so that, when executed, said executable code reads a datum from said location, uses said datum as input for an operation in said executable code, and yields said expected result;

wherein executing said modified executable code yields a result that varies with said datum;

and whereby subsequent tampering at said location and executing said modified executable code will yield an unexpected result.

6. The computer system of claim 5, wherein said means for choosing a location to protect from tampering chooses location in the data segment of the application.

7. The computer system of claim 5, wherein said means for choosing a location to protect from tampering chooses a location in the executable segment of the application.

8. The computer system of claim 5, wherein said means for choosing a location to protect from tampering chooses a location containing license-control code.

9. The method of claim 1, wherein the step of choosing a location to protect from tampering, a location containing license-control data is chosen.

10. The method of claim 1, wherein the step of choosing an executable code to modify, a code that an attacker would want to preserve is chosen.

11. The computer system of claim 5, wherein said means for choosing a location to protect from tampering chooses a location containing license-control data.

12. The computer system of claim 5, wherein said means for choosing an executable code to modify chooses a code that an attacker would want to preserve.

13. A computer-readable medium comprising computer-program instructions executable by a processor for:

choosing a location in said application to protect from tampering;

choosing an executable code in said application to modify;

observing an expected result of executing said executable code;

modifying said executable code so that, when executed, said executable code reads a datum from said location, uses said datum as input for an operation in said executable code, and yields said expected result;

wherein executing said modified executable code yields a result that varies with said datum;

and whereby subsequent tampering at said location and executing said modified executable code will yield an unexpected result.

14. The computer-readable medium of claim 13, wherein said computer-program instructions further comprise instructions for choosing a location in the data segment of the application to protect from tampering.

15. The computer-readable medium of claim 13, wherein said computer-program instructions further comprise instructions for choosing a location in the executable segment of the application to protect from tampering.

16. The computer-readable medium of claim 13, wherein said computer-program instructions further comprise instructions for choosing a location containing license-control code of the application to protect from tampering.

17. The computer-readable medium of claim 13, wherein said computer-program instructions further comprise instructions for choosing a location containing license-control data of the application to protect from tampering.

18. The computer-readable medium of claim 13, wherein said computer program instructions further comprise instructions for choosing a code that an attacker would want to preserve to modify.

* * * * *